United States Patent [19]

Purrazzella

[11] Patent Number: 5,600,123

[45] Date of Patent: Feb. 4, 1997

[54] HIGH-RESOLUTION EXTENDED FIELD-OF-VIEW TRACKING APPARATUS AND METHOD

[75] Inventor: Joseph Purrazzella, South Hampton, N.Y.

[73] Assignee: Litton Systems, Inc., Lexington, Mass.

[21] Appl. No.: 18,884

[22] Filed: Feb. 17, 1993

(Under 37 CFR 1.47)

[51] Int. Cl.$^6$ .................................................. G01B 11/00
[52] U.S. Cl. .................... 250/203.3; 250/234; 356/121
[58] Field of Search ........................... 250/203.1, 203.2, 250/203.3, 203.4, 203.6, 203.7, 234, 235, 236; 356/121, 139.01, 139.05, 139.07, 141.1, 141.2, 141.3, 141.4, 148; 359/196, 197, 212

[56] References Cited

U.S. PATENT DOCUMENTS

| | | | |
|---|---|---|---|
| 3,015,249 | 1/1962 | Taylor | 88/1 |
| 3,285,124 | 11/1966 | Lovins | 88/14 |
| 3,316,799 | 5/1967 | Daley et al. | 88/14 |
| 3,554,653 | 1/1971 | Zielke et al. | 356/153 |
| 4,472,054 | 9/1984 | Pouit | 356/352 |
| 4,725,138 | 2/1988 | Wirth et al. | 356/121 |
| 4,807,977 | 2/1989 | Sammells | 350/357 |
| 4,952,056 | 8/1990 | Tiefenthaler | 356/73.1 |
| 4,952,809 | 8/1990 | McEwen | 250/203.1 |
| 5,110,210 | 5/1992 | Fay et al. | 356/150 |

*Primary Examiner*—David C. Nelms
*Assistant Examiner*—John R. Lee
*Attorney, Agent, or Firm*—Michael H. Wallach

[57] ABSTRACT

An optical tracking system and method are disclosed. The optical tracking system includes a scanning mirror which scans and receives images within a field of view scannable by the mirror. An optical system receives images from the scanning mirror and directs the images upon a charge coupled device (CCD) camera. An Inertial Measurement Unit (IMU) beam serves as a fixed reference point from which the position of the scanning mirror is determined and is directed upon the CCD camera. A dispersive element provides and directs a pattern of light consisting of a grid of diffracted orders upon the CCD camera. The movement of the scanning mirror provides a corresponding movement of the diffracted orders. The position of the center of any diffracted order can be determined in relation to the IMU beam by centroiding. The position of the scanning mirror is determined by correlating the position of the diffracted orders to the position of the scanning mirror.

14 Claims, 3 Drawing Sheets

1

HIGH-RESOLUTION EXTENDED FIELD-OF-VIEW TRACKING APPARATUS AND METHOD

GOVERNMENT SUPPORT

The Government has rights in this invention pursuant to contract No. DASG 60-90-C-0038 awarded by the Department of the Army.

BACKGROUND OF THE INVENTION

Tracking systems for optically measuring the location or position of an object within a field of view have been developed for numerous applications. These tracking systems typically require the measurement of very small changes in the angle of incidence of light from the object being tracked. Autocollimators for example, are optical instruments used for measuring the movement of a distant reflecting surface. The basic principle of the autocollimator is that of observing the coincidence of an illuminated reticle or slit with its own image reflected from the distant reflector back through the instrument. When coincidence is observed, the distant reflector is accurately positioned perpendicular to the optical axis of the instrument. If the distant reflector is not perpendicular to the optical axis of the instrument, the reflected light will be displaced from the slit. The displacement of the reflected light is a measure of the angular deviation of the returning light beam which can be correlated with the angular deviation of the distant reflector.

The use of available autocollimators to provide tracking of the movement of objects has many limitations. Autocollimators are generally relatively large and thus may be inappropriate for applications having size constraints. Additionally, with a 0.5 microradian resolution and a 2 microradian repeatability, the accuracy and repeatability of available autocollimators is not suitable for extremely high precision applications. Furthermore, autocollimators typically require several seconds for a single measurement. Also, the noise level of present autocollimators may be too high for certain applications.

Accordingly, there is a continuing need for an improved optical tracking system that is compact, provides enhanced accuracy, resolution and operational speed at low noise levels.

SUMMARY OF THE INVENTION

The present invention provides an optical tracking system used to measure the movement of objects being tracked. The optical tracking system includes a scanning mirror which scans and receives an image within the scanned field of view scanned by the mirror. The scanning mirror is mounted on an actuator which controls the movement of the mirror so that it can be positioned within, or scanned across, the field of view in any desired manner. An optical system is employed to optically couple the image from the scanning mirror to an image sensor such as a charge coupled device, so that the reflected image can be recorded.

Coupled to the scanning mirror is a light dispersive element. Movement of the scanning mirror is thereby correlated with movement of the dispersive element. A light source such as a laser is positioned to direct a beam of radiation to the dispersive element. The dispersive element disperses the light from the light source into a pattern of light. A portion of the light pattern is directed onto the sensor and is within the field of view of the scanning mirror.

A preferred embodiment of the invention utilizes a control system including a data processor with a memory suitable for storing images in digital form and a controller, such as an application specific integrated circuit, that is used to control the light source and the scanning mirror, receive information from system sensors and monitor the relative angle of the steering mirror to an inertial measurement unit (IMU) beam. The IMU beam serves as a reference light source.

The optical tracking system of the present invention operates considerably faster, more accurately, with increased repeatability and produces less noise than known existing autocollimators. Additionally, the use of the light dispersive element increases the useful field of view in which to monitor the movement of the scanning mirror.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
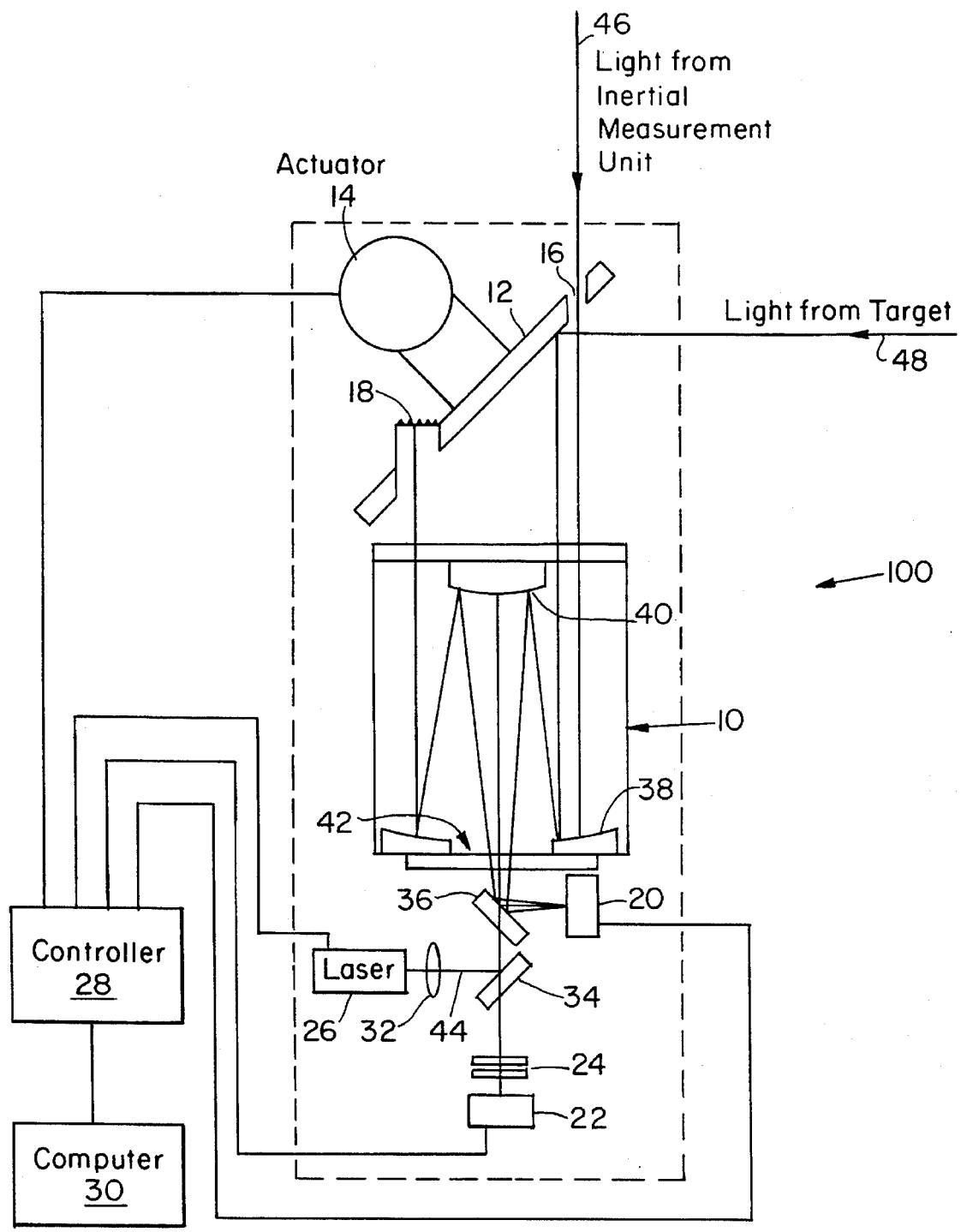
FIG. 1 is a schematic drawing of the optical components and control system of a preferred embodiment of the invention.

In FIG. 1, an optical tracking system 100 in accordance with the invention utilizes a rotatable scanning mirror 12 for receiving target images. An actuator 14 is coupled to scanning mirror 12 and actuates movement of mirror 12, to scan a field of view in which to find a target image. In the preferred embodiment, scanning mirror 12 has at least a 4° field of view. Alternatively, scanning mirror 12 may have fields of view of differing sizes.

Light from target image 48 is received by scanning mirror 12 and is reflected onto primary mirror 38 of optical system 10. Primary mirror 38 receives image light 48 from scanning mirror 12 and reflects the image light 48 towards secondary mirror 40. Secondary mirror 40 receives and redirects image light 48 through aperture 42 which is centered on primary mirror 38. Image light 48 is then directed by reflecting mirror 36 into the field of view of a sensor, such as charge coupled device (CCD) camera 20.

In the preferred embodiment, CCD camera 20 is 7 mm long, is placed at the focus of a 2 meter focal length and has a 2 cm aperture diffraction limited lens which results in a 0.2° field of view. CCD camera 20 has 500 light detector or sensing elements (sometimes referred to as picture elements, or simply "pixels") on it with the average spacing of 14 microns. The light through the lens of CCD camera 20 forms a disc pattern of 154 microns for a 0.633 micron light source or a size of 11 pixels. The 2 meter focal length lens of CCD camera 20 provides a pixel spacing of 7 microradians. Alternatively, other cameras of different sizes, characteristics and attributes may be used. Additionally, a second CCD camera may also be used in conjunction with CCD camera 20.

An inertial measurement unit (IMU) beam 46 serves as a reference point from which the position of scanning mirror 12 is determined. The position of IMU beam 46 remains constant, therefore, the position of scanning mirror 12 is determined by monitoring the movement of scanning mirror 12 relative to IMU beam 46. IMU beam 46 originates from a laser in a fixed position located external to optical tracking system 100. Light from IMU beam 46 passes through hole 16 within scanning mirror 12 and enters optical system 10. Within optical system 10, IMU beam 46 is reflected by primary mirror 38 towards secondary mirror 40. Secondary mirror 40 redirects IMU beam 46 out of optical system 10 through aperture 42. IMU beam 46 then is deflected by reflecting mirror 36 to CCD camera 20. Alternatively, IMU beam 46 may be directed upon CCD camera 20 without passing through hole 16, optical system 10 or reflecting mirror 36.

Figure 2:
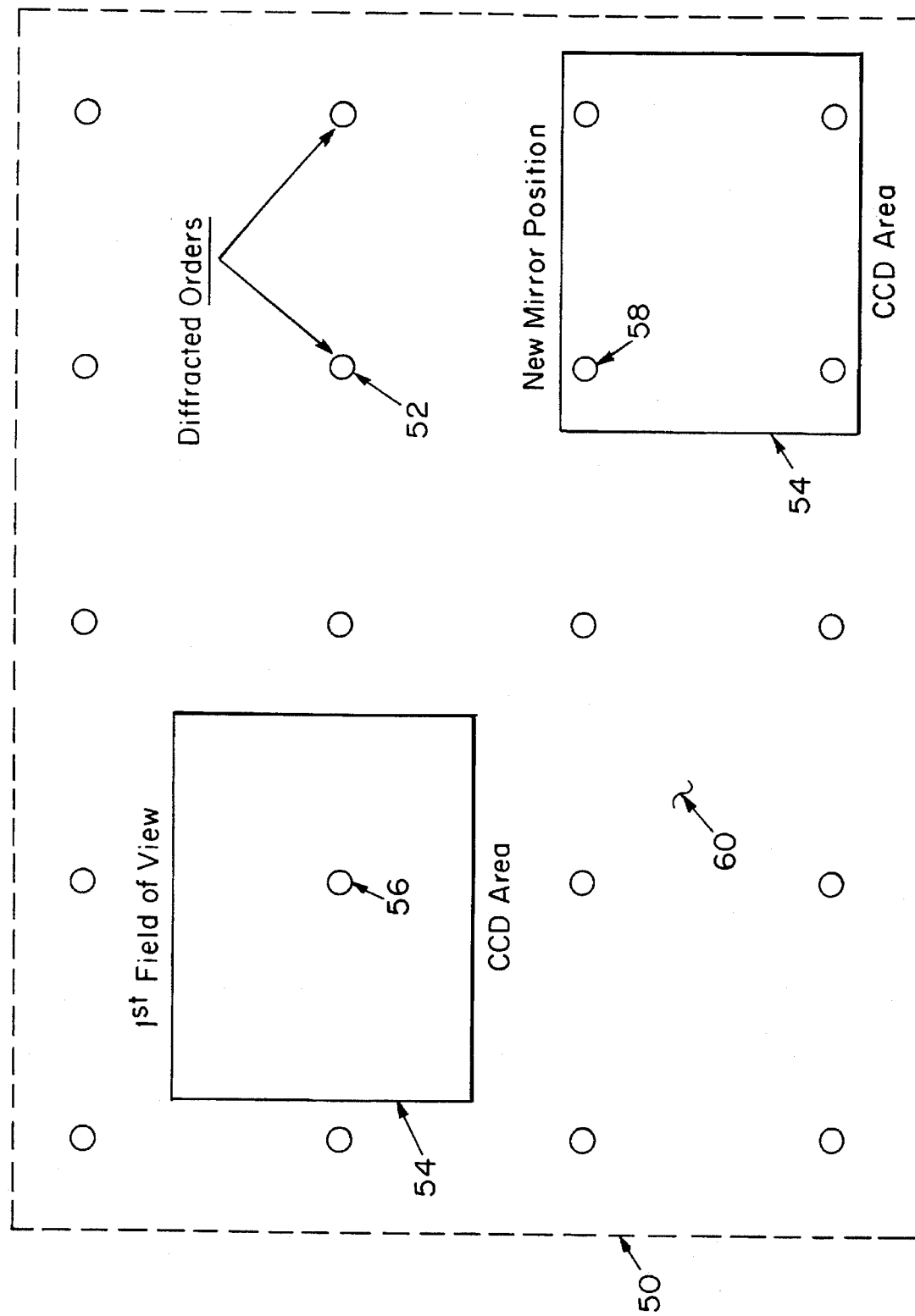
FIG. 2 is a schematic of a light pattern and positioning of the image within the pattern for a preferred embodiment of the invention.

Referring to both FIGS. 1 and 2, a dispersive element 18 such as a two dimensional reflective grating provides CCD camera 20 with a pattern of light 50 on focal plane 60.

In the preferred embodiment, a laser 26 produces the pattern of light 50. Referring to FIG. 1, laser 26 produces beam 44 which passes through lens 32 and deflects off reflecting mirror 34. Reflecting mirror 34 directs beam 44 into optical system 10 through aperture 42. Beam 44 is directed towards secondary mirror 40 and is redirected to primary mirror 38. Primary mirror 38 then receives and directs beam 44 to dispersive element 18. Dispersive element 18 reflects beam 44 back into optical system 10 as a pattern of light 50 (FIG. 2). The rectangular pattern of light 50 reflected by dispersive element 18 is reflected back into optical system 10. Primary mirror 38 receives the pattern of light 50 and redirects it to secondary mirror 40. Secondary mirror 40 reflects the pattern of light 50 through aperture 42 and out of optical system 10. The pattern of light 50 is directed to CCD camera 20 by reflecting mirror 36.

Controller 28 receives information from CCD camera 20, photo-potentiometer (photopot), laser 26 and actuator 14. Information received by controller 28 is processed by a data processor such as digital computer 30. Once the information is processed by computer 30, controller 28 issues commands regarding the operation of actuator 14, CCD camera 20, laser 26 and photopot 26. The information which photopot 22 and CCD camera 20 delivers to controller 28 is used in determining centers of diffracted orders 52. Computer 30 processes the information and determines the center of diffracted orders 52.

Referring to FIGS. 1 and 2, the pattern of light 50 provided by dispersive element 18 is made up of a grid of diffracted orders 52 (spots) and extends across the 4° field of view of scanning mirror 12. CCD area 54 is in the field of view of CCD camera 20. At least one diffracted order 52 is within CCD area 54 at a given time. Also within CCD area 54 is an image of IMU beam 46 (not shown). The pixels in CCD camera 20 receive the light of diffracted orders 52. The intensity of the light received by each pixel is converted into pixel intensity signals.

A centroid calculation is accomplished by applying coordinate dependent weights, defined by a Weighted Pixel Algorithm (WPA) to digitize pixel intensity signals and summing the weighted intensities. The weighting may be viewed as a multiplication of the digitized pixel intensity signals by an array of constant weights. The sum of the weighted intensities is divided by the sum of the unweighted intensities to yield the centroid of the diffracted order 52. Therefore, the position of the center of any diffracted order 52 on focal plane 60 can be determined by the centroid software.

An image processing board within computer 30 running the centroid software determines the center of a diffracted order 52 within 0.045 pixels or 0.35 microradians standard deviation error. The sensitivity can be varied by changing the parameters. By centroiding upon a diffracted order 52 within CCD area 54, the position of scanning mirror 12 can be determined in relation to IMU beam 46. The centroiding method provides a 0.35 microradian rms repeatability while taking 15 samples per second. Noise is reduced by averaging.

The movement of scanning mirror 12 produces a corresponding movement in the diffracted orders 52 in relation to CCD area 54. When a diffracted order 56 which is being centroided moves to the edge of CCD area 54, an exchange is made for another diffracted order 58 to accommodate the new position of scanning mirror 12. The movement results in a new mirror position and the center of the new diffracted order 58 is determined.

Photopot 22 (FIG. 1) receives signals from secondary mirror 40 through filters 24. The controiding process speeds up the processing by only looking over small windows within the CCD image plane rather than the whole pattern of light 50. Rough measurements are made using only one sample and increasing processing speed during fast moves. More accurate measurements are made by increasing the number of samples. A further increase in speed can be made by accessing the focal plane in parallel rather than in serial format.

In the preferred embodiment, referring to FIG. 1, dispersive element 18 is mounted on scanning mirror 12 and comprises a flat return mirror with a two dimensional grating on the reflective surface. The grating of dispersive element 18 has +/−10 diffracted orders 52 and produces a rectangular pattern of light over a 4° field when a beam of light is directed at dispersive element 18. The spacing of the grating is set so that each diffracted order 52 (FIG. 2) extends less than 1 field of view of optical system 10. The grating is made with either amplitude modulation, phase modulation or both, so that the diffracted orders 52 (FIG. 2) are of equal intensity within the limits of CCD camera 20. Alternatively, dispersive element 18 may comprise a light source or sources coupled to scanning mirror 12 which produces the pattern of light 50 (FIG. 2).

Figure 3:
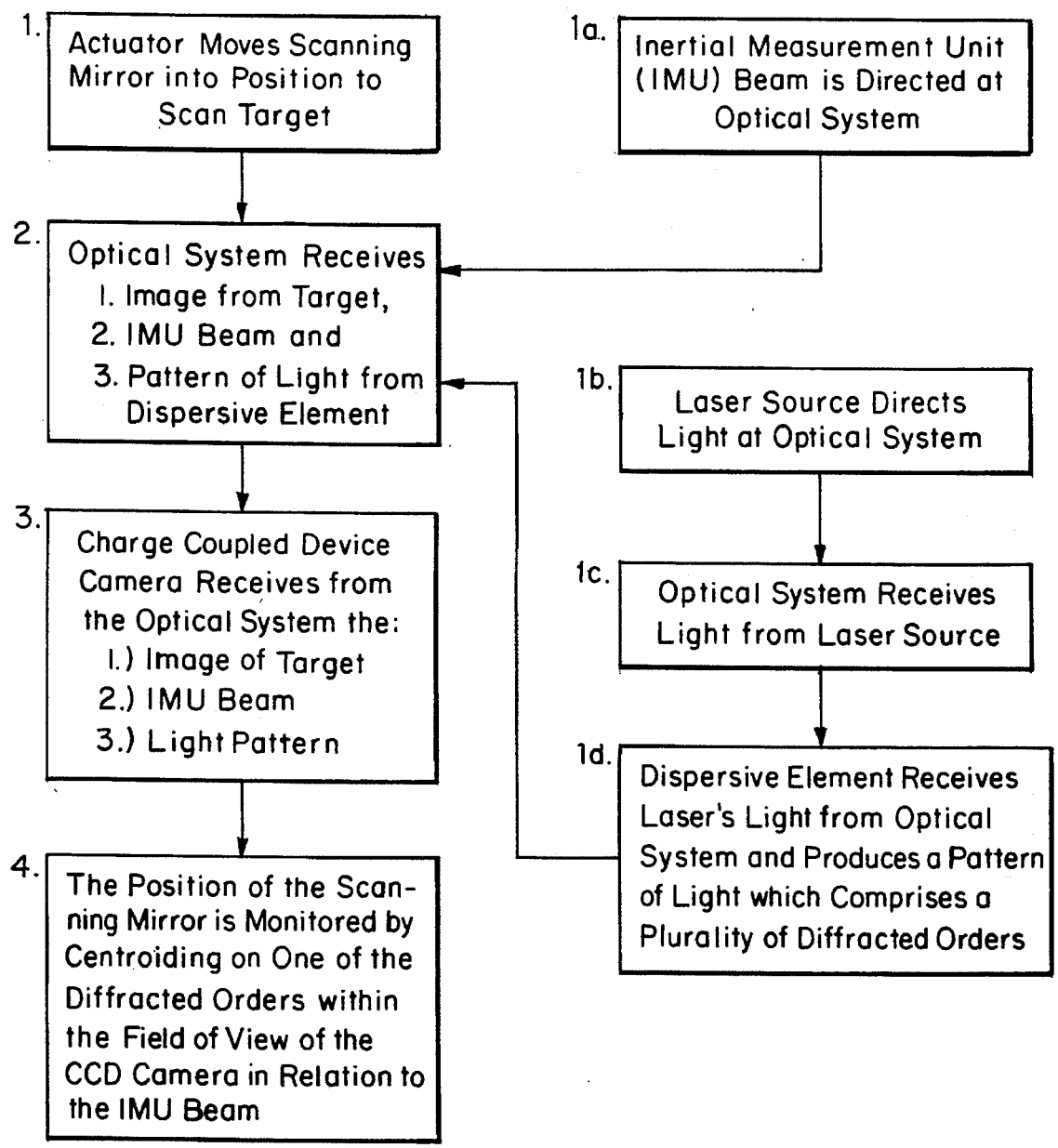
FIG. 3 is a schematic process flow diagram illustrating the tracking method of a preferred embodiment of the invention.

FIG. 3 illustrates the steps which occur in the preferred embodiment of the method of tracking for the present invention. In step 1, the actuator moves the scanning mirror into position to scan the target image. In step 1a, which occurs simultaneously with step 1, the IMU beam is directed into the optical system. Steps 1b–1d also occur simultaneously with step 1. In step 1b, the laser source directs a beam of light at the optical system. In step 1c, the optical system receives the light from the laser source. In step 1d, the dispersive element receives the beam from the optical system and produces a pattern of light comprising a grid of diffracted orders.

In step 2, the optical system receives signals from steps 1, 1a and 1d. The signals received by the optical system in step 2 are the light of the target image from the scanning mirror (step 1), the IMU beam (step 1a), and the pattern of light from the dispersive element (step 1d).

In step 3, a charge coupled device camera receives the signals representing the target image light, the IMU beam and the light pattern from the optical system simultaneously. This information is forwarded to a controller and data processor which processes the information.

In step 4, the information processed by the controller and data processor is used to determine the position of the scanning mirror. A centroiding program is used to determine the position of a diffracted order within the field of view of the CCD camera in relation to the IMU beam. Once the position for a given diffracted order is determined, the position for the scanning mirror is found.

Equivalents

While this invention has been particularly shown and described with reference to preferred embodiments thereof, it will be understood by those skilled in the art that various changes in form and details may be made therein without departing from the spirit and scope of the invention are defined by the appended claims.

The invention claimed is:

1. An optical tracking system comprising:

a scanning mirror positioned to receive an image from within a field of view scannable by the mirror;

an actuator on which the scanning mirror is mounted to control movement of the mirror;

a light dispersive element that is coupled to the scanning mirror such that movement of the mirror is correlated with movement of the dispersive element;

a sensor onto which the image from the scanning mirror is directed;

an optical system to optically couple the image from the scanning mirror to the sensor;

a first light source that is optically coupled to the dispersive element such that light dispersed from the dispersive element provides a pattern of light, some portion of the light pattern being directed onto the sensor throughout the field of view of the scanning mirror; and a second light source providing a reference optical signal optically coupled and directed onto the sensor.

2. The optical tracking system of claim 1 where the optical system receives optical signals from the first light source and the reference optical signal, the optical system directing the signals from the first light source and the reference optical signal onto the sensor.

3. The optical tracking system of claim 1 where the light dispersive element comprises a reflective surface and a two dimensional grating.

4. The light dispersive element of claim 3 where the grating has at least amplitude modulation.

5. The light dispersive element of claim 3 where the grating has at least phase modulation.

6. The optical tracking system of claim 1 where the sensor comprises a charge coupled device.

7. The optical tracking system of claim 1 wherein the first light source comprises a laser.

8. The optical tracking system of claim 1 further comprising a photopotentiometer positioned to receive light from the dispersive element.

9. A method of optically tracking an image comprising the steps:

scanning the image with a scanning mirror, the scanning mirror having a field of view;

optically coupling the image from the scanning mirror with an optical system and directing the coupled image to a sensor;

directing light from a first light source onto a light dispersive element, the light dispersive element projecting a pattern of light, a portion of the pattern being directed onto the sensor throughout the field of view of the scanning mirror;

monitoring the position of the scanning mirror by determining the position of a portion of the pattern of light; and directing a reference optical signal onto the sensor.

10. The method of optically tracking an image of claim 9 further comprising the step of directing the reference optical signal and the pattern of light onto the sensor with the optical system.

11. An optical tracking system comprising:

a scanning mirror positioned to receive an image from within a field of view scannable by the mirror;

an actuator on which the scanning mirror is mounted to control movement of the mirror;

a light dispersive element that is coupled to the scanning mirror such that movement of the mirror is correlated with movement of the dispersive element;

an image sensor onto which the image from the scanning mirror is directed;

an optical system to optically couple the image from the scanning mirror to the sensor;

a first light source that is optically coupled to the dispersive element such that light dispersed from the dispersive element provides a pattern of light, some portion of the light pattern being directed onto the sensor throughout the field of view of the scanning mirror;

a reference optical signal from a second light source, the signal being optically coupled and directed onto the sensor;

an optical sensor positioned to receive light from the dispersive element;

a controller for receiving input at least from the image sensor, light source, optical sensor and actuator, the controller providing output for controlling the operation of at least the sensor, light source and actuator; and a data processor connected to the controller to receive and record images from the image sensor.

12. The optical tracking system of claim 11 wherein the light dispersive element comprises a reflective surface and a two dimensional grating, wherein the grating has at least amplitude modulation.

13. The optical tracking system of claim 11 where the optical system receives optical signals from the first light source and the reference optical signal, the optical system directing the signals from the first light source and the reference optical signal onto the sensor.

14. The optical tracking system of claim 11 wherein the first light source comprises a laser.

* * * * *